US005695668A

United States Patent [19]

Boddy

[11] Patent Number: 5,695,668

[45] Date of Patent: Dec. 9, 1997

[54] OVEN WITH SELECTIVELY ENERGIZED HEATING ELEMENTS

[76] Inventor: Victor R. Boddy, 170 King Rd., Chalfont, Pa. 18914

[21] Appl. No.: 525,457

[22] Filed: Sep. 8, 1995

[51] Int. Cl.[6] .............................. F27D 11/00; F24C 15/34; A21B 1/02; A21B 1/26

[52] U.S. Cl. .......................... 219/400; 219/396; 219/399; 219/486; 99/476; 126/21 A

[58] Field of Search .................................... 219/391, 395, 219/396, 398, 399, 400, 483, 486, 385, 386; 99/474, 476; 126/21 A; 426/236

[56] References Cited

U.S. PATENT DOCUMENTS

| | | | |
|---|---|---|---|
| 3,487,198 | 12/1969 | Sloan | 219/397 |
| 3,731,039 | 5/1973 | Beech | 219/399 |
| 4,238,669 | 12/1980 | Huntley | 219/405 |
| 4,242,554 | 12/1980 | Hurko et al. | 219/486 |
| 4,441,015 | 4/1984 | Eichelberger et al. | 219/486 |
| 4,535,226 | 8/1985 | Logel et al. | 219/400 |
| 4,587,946 | 5/1986 | Doyon et al. | 126/20 |
| 4,813,398 | 3/1989 | Savage | 126/21 A |
| 4,892,083 | 1/1990 | König | 126/21 R |
| 4,894,518 | 1/1990 | Ishikawa et al. | 219/413 |
| 4,924,763 | 5/1990 | Bingham | 99/339 |
| 4,942,288 | 7/1990 | Worsham et al. | 219/399 |
| 4,951,645 | 8/1990 | Luebke et al. | 126/20.1 |
| 5,103,801 | 4/1992 | Herring et al. | 126/374 |
| 5,204,503 | 4/1993 | Maiellano et al. | 219/400 |
| 5,239,917 | 8/1993 | Lutkie et al. | 99/443 C |
| 5,280,157 | 1/1994 | Hornung | 219/397 |

FOREIGN PATENT DOCUMENTS

| | | | |
|---|---|---|---|
| 7419334 | 6/1974 | France | 219/398 |
| 7430166 | 9/1974 | France | 219/398 |
| 3241092 | 5/1984 | Germany | 219/400 |
| 59-112132 | 6/1984 | Japan | 219/396 |

*Primary Examiner*—Mark H. Paschall
*Assistant Examiner*—J. Pelham
*Attorney, Agent, or Firm*—Panitch Schwarze Jacobs & Nadel, P.C.

[57] ABSTRACT

An oven for heating food includes a refractory slab for placing a food item to be heated thereon. The refractory slab is preheated to a preselected temperature by a first electric resistance heating element disposed below the slab. The oven also includes a second electric resistance heating element and circulating fan disposed above the food to be heated. When food is cooking, electrical power is switched from the first heating element to the second heating element so that both heating elements are never operated at the same time. Food is cooked by the dual action of conduction from the slab and convection from the second heating element and fan. After the food is cooked, power is switched back to the first heating element to maintain the slab at the preselected temperature.

13 Claims, 4 Drawing Sheets

OVEN WITH SELECTIVELY ENERGIZED HEATING ELEMENTS

FIELD OF THE INVENTION

The present invention relates generally to ovens and, more particularly to an electric pizza-style food oven having two separate heat sources which are selectively operated.

BACKGROUND OF THE INVENTION

Electric cooking ovens are usually constructed with top and bottom resistance-type heating elements. The top and bottom elements are simultaneously or selectively operated to bake or broil food. One or both of the elements can be thermostatically controlled during baking or broiling. In electric cooking ovens, food is usually placed on a rack disposed between the top and bottom elements. Some electric cooking ovens include fans for convectively heating the food. Convection heating significantly reduces cooking time.

During use, electric cooking ovens draw very large amounts of power. Typically, the top and bottom elements of ovens each draw at least 1500 watts (up to 3000 watts total). Such ovens cannot operate from a standard 110 volt (V) electrical outlet because 110 V outlets cannot safely handle the current of over 25 amps. Thus, such ovens usually require a 220 V outlet or a customized power source. Accordingly, they cannot be easily installed at any location.

Another type of oven has refractory material, such as a plurality of refractory bricks, at its bottom for placing the food thereon. This type of oven is typically commercially employed for cooking pizzas and the like. A single heating source heats up the bricks, which, in turn, conductively release the heat to the pizza to cook the pizza. The heating source may be gas, electric or wood and is disposed generally beneath the bricks. These types of ovens do not rapidly cook food. A typical pizza oven of this type usually takes over ten minutes to cook a standard size pizza.

The prior art thus includes pizza-type ovens which cook slowly and convective electric ovens which cook fast but suffer from excessive power requirements. Accordingly, there is still a need for an electric pizza-type oven which cooks quickly and operates with sufficiently low power to be operable from a 110 V outlet. The present invention fills this need by providing an oven having a refractory slab which is initially preheated by a lower heating element to a preselected temperature and thermostatically maintained at the preselected temperature. When it is desired to cook a food product, the food is placed on the slab and the oven door is closed. An upper convective heating element is then turned on for a preselected time period. When the upper element turns on, the lower element turns off so that the oven does not draw excessive power. The upper element and the preheated slab function together to rapidly cook the food both from above and below.

SUMMARY OF THE INVENTION

The present invention is an oven comprising a housing having a food heating zone, a first heating element above the food heating zone for releasing heat energy into the food heating zone, a refractory slab below the food heating zone, and a second heating element for heating the refractory slab. The refractory slab has a surface for receiving a food item to be heated. The refractory slab stores and releases heat energy received from the second heating element. A power supply selectively delivers power to either the first or the second heating element, but not to both at the same time. A thermostat maintains the temperature of the refractory slab at a preselected value when the power supply delivers power to the second heating element. A switch circuit causes the power supply to switch the power from the second heating element to the first heating element for a preselected time period, and causes the power supply to switch the power back to the second heating element after the preselected time period has elapsed. The food heating zone receives heat energy from both the first heating element and the refractory slab during the preselected time period.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF PREFERRED EMBODIMENT

Figure 1:
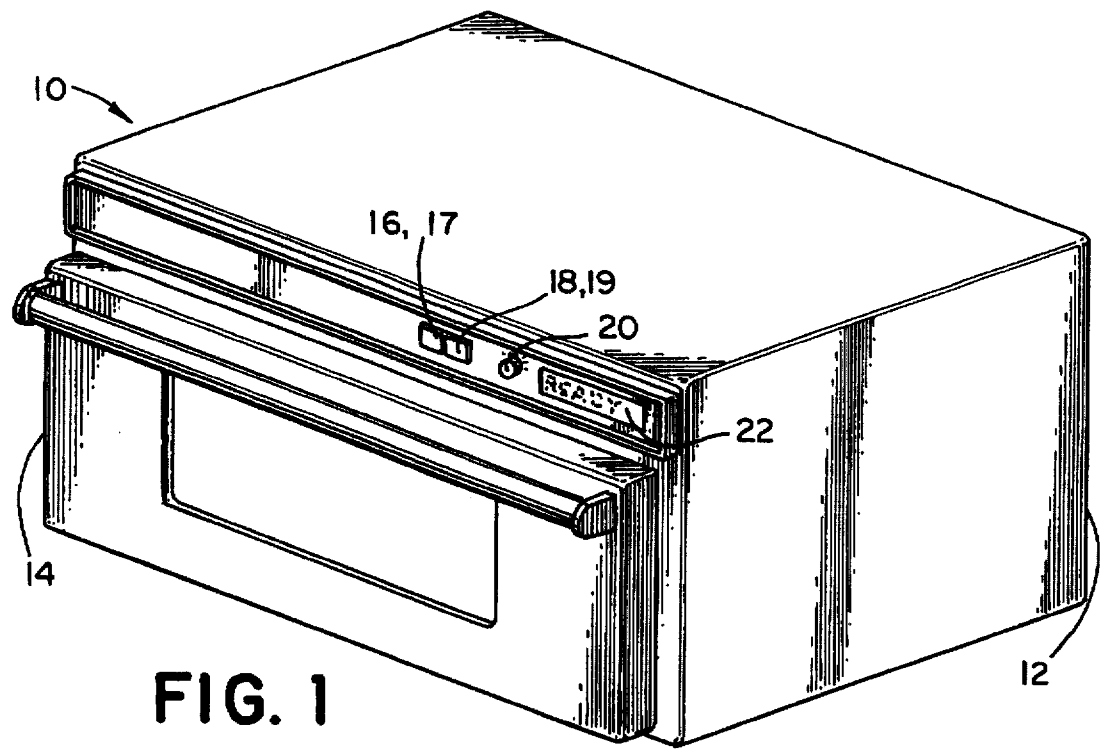
FIG. 1 is a perspective view of the oven in accordance with a preferred embodiment of the present invention.

Certain terminology is used herein for convenience only and is not be taken as a limitation on the present invention. In the drawings, the same reference numerals are employed for designating the same elements throughout the several figures.

FIG. 1 shows a perspective view of an oven 10 in accordance with a preferred embodiment of the present invention. The oven 10 is defined by a triple-wall insulated preferably stainless steel housing or cabinet 12 and a pull-down front door 14, as is well-known in the art. However, the scope of the invention includes any type of housing or cabinet 12 and door structure suitable for use as an oven. For example, the housing need not be triple-insulated and could be constructed of material other than stainless steel. Likewise, the door could swing open or slide open, instead of pulling down.

Mounted to the front of the cabinet 12 are a combined oven power on/off switch 16 and indication lamp 17, a combined "START" or timer activation switch 18 and indication lamp 19, a knob 20 for setting the time period of a timer (not shown) activated by the timer activation switch 18, and a "READY" status lamp 22. The function of the elements 16–22 are fully described below.

Figure 2:
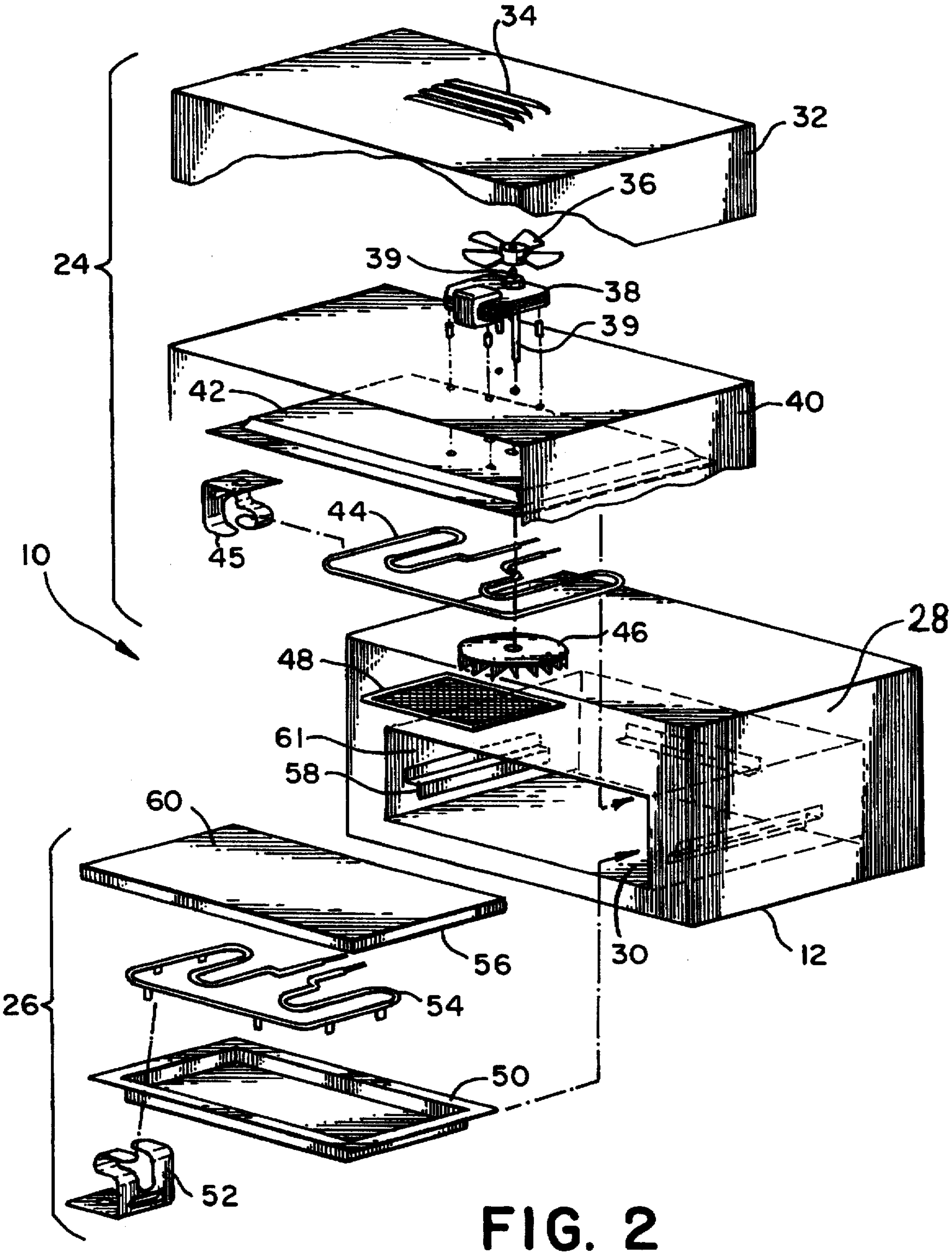
FIG. 2 is an exploded schematic view of some of the mechanical parts of the oven of FIG. 1.

FIG. 2 shows an exploded view of some of the primary mechanical parts of the oven 10. (The front door 14 is not shown.) The cabinet 12 receives all of the mechanical parts. The mechanical parts may be divided into two categories, those associated with an upper assembly, labelled as 24, and those associated with an oven chamber assembly, labelled as 26. The parts 24 of the upper assembly are mounted in an upper portion 28 of the cabinet 12 which is hidden from view in FIG. 2. The parts 26 are mounted in lower portion 30 of the cabinet 12, which is also the lower portion of the oven chamber.

The parts 24 of the upper assembly, from top to bottom, include a cover panel 32 having ventilation louvers 34 thereon, a ventilation fan 36, a fan motor 38 and shaft 39 and related mounting hardware, an inner mounting panel 40, an upper pan reflector 42, an upper heating element 44, upper element mounting clips 45, an internal fan 46 and an internal fan cover 48. The upper pan reflector 42 reflects heat from the upper heating element 44 downward toward the oven chamber. The ventilation fan 36 and internal fan 46 both run whenever the oven's power on/off switch 16 is on. The internal fan 46 and upper heating element 44 operate together in a manner well-known in the prior art to provide convection heating. The fan motor 38 turns the shaft 39 which simultaneously drives the ventilation fan 36 and the internal fan 46. The mounting clips 45 secure the upper heating element 44 to the upper pan reflector 42 and space the upper heating element 44 from the upper pan reflector 42. The ventilation fan 36 draws in ambient air through the ventilation louvers 34 to cool the circuit elements (not shown) which are housed in the space between the upper top surface of the inner mounting panel 40 and the cover panel 32. The air flows through this space and is expelled from the bottom of the cabinet 12. To facilitate the air flow, the inner mounting panel 40 does not extend across the full length of the cover panel 32. Thus, the air flows from the space, through the gap between the sides of the inner mounting panel and the cover panel 32, to the bottom of the cabinet 12.

The parts 26 of the oven chamber assembly, from bottom to top, include a lower pan reflector 50, lower element mounting clips 52, lower heating element 54, and refractory slab 56. The refractory slab 56 is removably mounted on shelving 58 which extends from the inner walls of the oven chamber. The refractory slab 56 has an upper surface 60 for receiving food to be cooked. The housing 12 establishes a food heating zone 61 which is defined by the space above the upper surface 60 of the refractory slab 56 and below the parts 24 of the upper assembly. In use, the refractory slab 56 conductively radiates heat to food placed on the slab's upper surface 60.

Although the preferred mode of the invention is to place the food to be cooked on the upper surface 60 of the refractory slab 56, the food could alternatively be placed on a rack slightly above the upper surface 60.

In the preferred embodiment of the invention, the upper and lower heating elements 44 and 54 are standard electric resistance elements of approximately 1500 W. However, the scope of the invention includes other types of electrically powered heating elements such as aluminum cast block elements and quartz elements, and other wattage levels.

One important feature of the invention is that the refractory slab 56 is preheated by the lower heating element 54 to a preselected value, typically about 500 degrees Fahrenheit, before food is placed in the oven 10 to be heated. The refractory slab 56 in the present embodiment is constructed of a single piece of refractory material, such as cordierite. The refractory slab 56 may be a single slab or may be constructed of a plurality of bricks or slab portions. The refractory slab 56 is of sufficient length and width so as to extend over the entire length and width of the oven chamber. In one embodiment of the invention, the refractory slab 56 is of sufficient dimensions to receive at least one personal size pizza and is of sufficient mass to store and release enough heat energy to cook the pizza in under two minutes using only a 1500 W upper heating element 44 as an additional source of heat energy. A suitable refractory slab 56 of cordierite which can meet this performance requirement has a length of about 20 inches, a width of about 12 inches, a thickness of about 1½ inches, and a mass of about 10–15 lbs. Such a slab requires about one hour of continuous heating by the lower heating element 54 to reach about 500 degrees Fahrenheit. Thereafter, the refractory slab 56 maintains the preselected temperature value by receiving significantly shorter applications of heat energy from the lower heating element 44.

Figure 3:
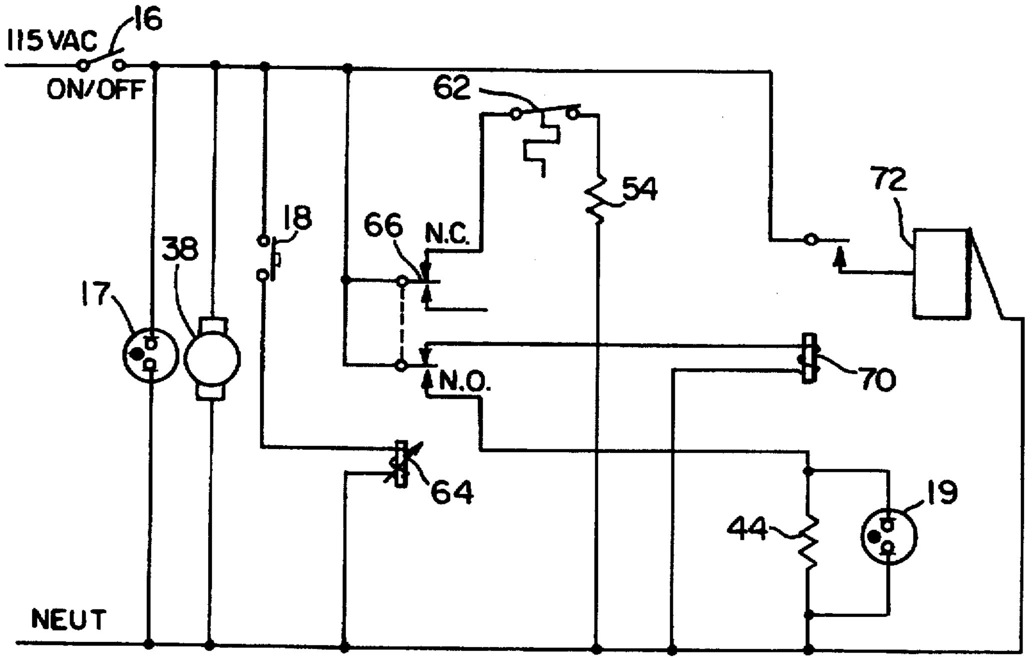
FIG. 3 is an electrical schematic diagram of the circuit elements of the oven of FIG. 1.
Figure 4A:
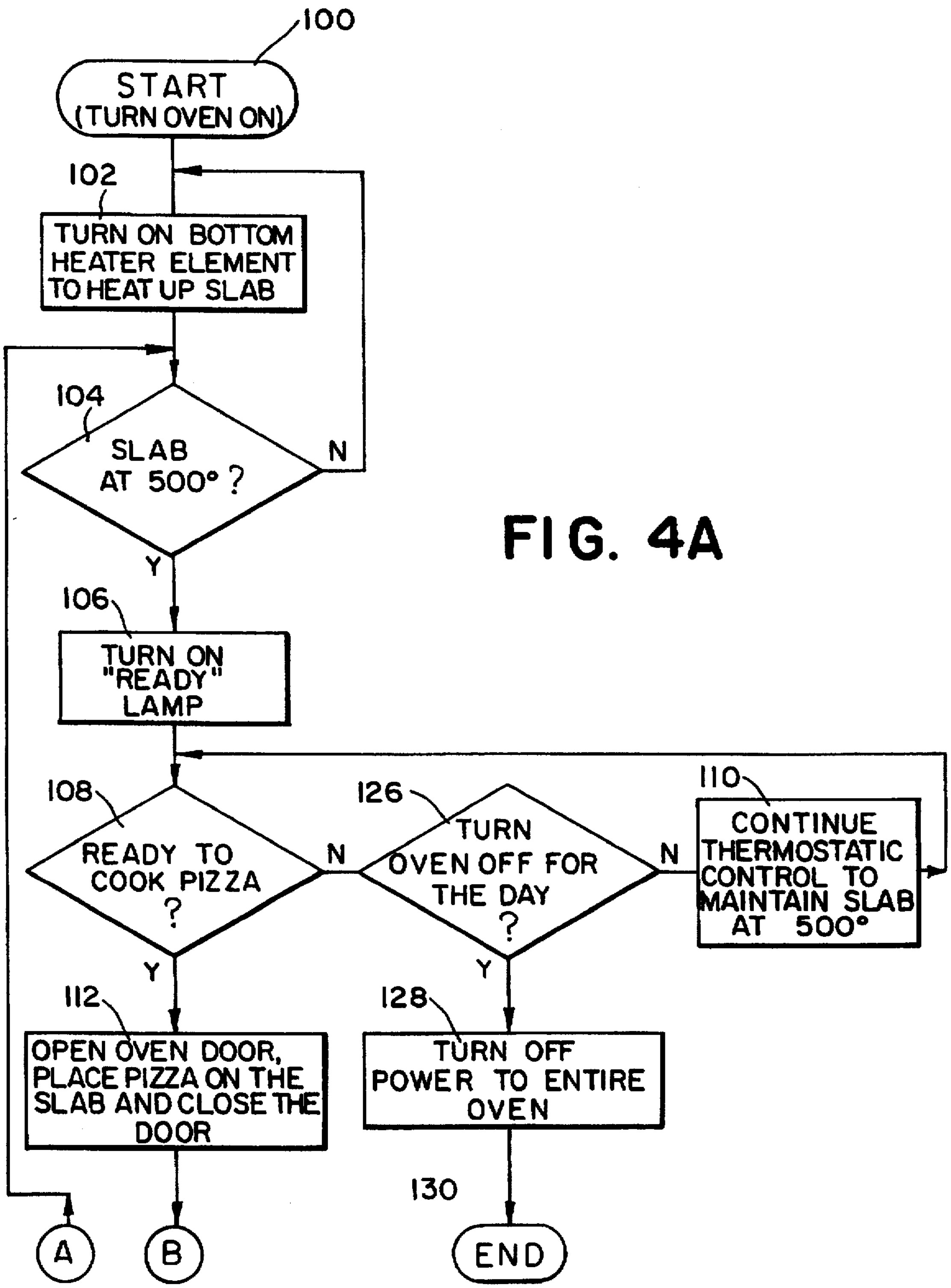
FIGS. 4A and 4B, taken together, are a flowchart of the operation of the oven of FIG. 1.
Figure 4B:
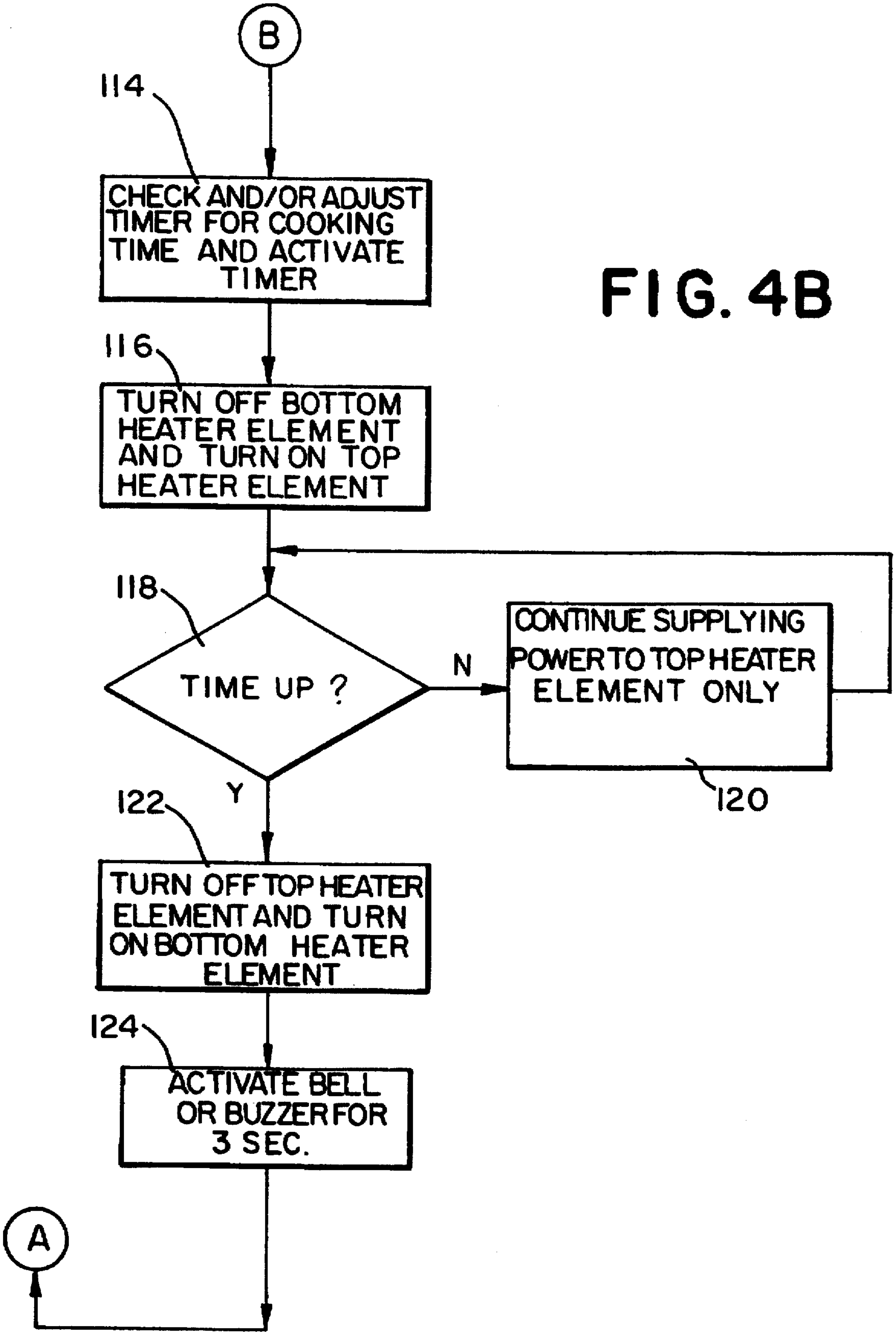

Another important feature of the invention is the manner in which the upper and lower heating elements 44 and 54 are controlled. The heater control feature is best described with respect to FIGS. 3 and 4. FIG. 3 is a schematic diagram of the circuit elements of the oven 10. Some of the parts shown in FIGS. 1 and 2 are represented schematically in FIG. 3 and labelled with like numbers. FIGS. 4A and 4B, taken together, are a flowchart of the operation of the oven 10 described in steps 100–130. For convenience, all of the figures are referenced in the description below. In the example of FIGS. 4A and 4B, the oven 10 is employed to cook a pizza. However, it should be understood that the invention is not limited to cooking any particular kind of food.

When it is desired to start the oven 10, an operator turns on the power switch 16 (step 100) and 115 V AC power is applied to the circuit of FIG. 3. When the power is turned on, a lamp 17 behind the power switch 16 lights up and the fan motor 38 which powers the ventilation fan 36 and the internal fan 46 goes on. Power is immediately applied to the lower heating element 54 to heat up the refractory slab 56 (step 102). When the temperature of the refractory slab 56 reaches its preselected value (e.g., 500 degrees Fahrenheit), a "READY" status lamp 22 is turned on (steps 104, 106). (The "READY" status lamp 22 is not shown in FIG. 3, but is shown in FIG. 1 as an LED or LCD display.) A thermostatic element, thermodisc 62, operates to regulate power to the lower heating element 54 to maintain the refractory slab 56 at the preselected value. If the operator does not immediately use the oven 10 and the operator is not ready to turn the oven 10 off for the day, the thermodisc 62 continues to sense the temperature of the refractory slab 56 and regulates power to the lower heating element 54 to maintain the sensed slab temperature at the preselected value (steps 108, 126, 110). Thus, the thermodisc 62 operates to continuously maintain the oven 10 in the "READY" state. If the operator desires to cook a pizza, the operator opens the oven door 14, places the pizza on the refractory slab 56 and closes the oven door 14 (steps 108, 112). The operator then checks the setting of the knob 20 to confirm and/or adjust the setting of the time period of timer 64 and activates the timer 64 by pressing the "START" or timer activation switch 18 (step 114). In one embodiment of the invention suitable for cooking personal size fresh pizzas, the timer 64 is set for 1.5 minutes but is adjustable to other time periods greater or less than 1.5 minutes. In another embodiment of the invention, the timer is preset and non-adjustable, and there is no adjusting knob 20.

Upon activation of the switch 18, relay 66 is engaged for the amount of time associated with the timer 64. Engaging the relay 66 causes power to be continuously applied to the upper heating element 44 and causes power to be turned off to the lower heating element 54 (steps 116, 118, 120). During this time period, a lamp 19 behind the switch 18 is turned on to indicate that the pizza is cooking. When the time period set by the timer 64 has elapsed, the relay 66 transfers power back to the lower heating element 54 (causing the lamp 19 to turn off) and starts relay 70 which powers a buzzer 72 for a short period of time, such as three seconds (steps 122, 124 and return to step 104). The buzzer 72 alerts the operator that the pizza is done cooking and should be removed from the oven 10.

If the operator intends to use the oven 10 again in the same day, the oven 10 remains on with the lower heating element 54 maintaining the temperature of the refractory slab 56 at the preselected value (steps 108, 126, 110). If the heating cycle for cooking the pizza caused the refractory slab 56 to drop below the preselected value, the "READY" lamp 22 goes off and goes back on when the preselected value is reached again. Thus, the operator might have to wait a short period of time until another pizza can be cooked. However, the wait time will be significantly shorter than the time to initially heat up the refractory slab 56. For example, the wait time for a refractory slab 56 of the mass and dimensions described above will be less than one minute. In fact, if slab reheating is necessary, the refractory slab 56 described above can usually be reheated during the time that it takes to load and unload the oven 10. Since the wait time runs concurrently with the loading and unloading time period, it will usually not be necessary to "wait" any additional time to begin cooking the next pizza or batch of pizzas. Thus, the oven 10 having a refractory slab 56 of the mass and dimensions described above can cook about 30 pizzas per hour, assuming a 1.5 minute cook cycle per pizza and a 30 second time period to load and unload the oven 10 and set any optional controls.

When the operator is finished cooking pizzas for the day, the operator turns off the power switch 16 which shuts off power to all circuit elements of the oven 10 (steps 126, 128, 130).

The scope of the invention includes other implementations of the circuit elements shown in FIG. 3. For example, the control features may be implemented by equivalent hardware elements, or in a microprocessor-controlled circuit. Likewise, the panel of indicators, control knobs and switches shown in FIG. 1 and the functions which they serve may be arranged or implemented in different ways other than is shown in FIG. 1.

Although the embodiment in FIG. 2 provides a single motor 38 for driving both the ventilation fan 36 and the internal convection fan 46, the scope of the invention includes an embodiment wherein the internal fan 46 is operated independently of the ventilation fan 36 (e.g., by a separate motor). In such an embodiment, the internal fan 46 would run only when the upper heating element 44 is on to provide convection heating.

In the preferred embodiment of the invention, the food in the food heating zone 61 is cooked from above by convection heating and from below by conduction heating. However, the scope of the invention includes an embodiment wherein the food is cooked from above by conduction heating, instead of convection heating. This embodiment is identical to the embodiment described above, except that there is no internal fan 46. Cooking time will be longer in this embodiment.

The oven 10 is suitable for heating and/or cooking. The actual heating and cooking times will vary with the type, size, initial temperature and desired final temperature of the food item.

As noted above, one important feature of the oven 10 is that it can operate from a standard 110 V electrical outlet. The oven 10 is also lightweight, easy to move and easy to set up. Thus, the oven 10 can be easily and quickly placed in compact locations at a wide variety of commercial outlets, including bars, convenience stores, golf courses, restaurant countertops, and the like.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An oven comprising:

(a) a housing having a food heating zone;

(b) a first heating element above the food heating zone for releasing heat energy into the food heating zone;

(c) a refractory slab below the food heating zone;

(d) a second heating element for heating the refractory slab, the refractory slab storing and releasing heat energy received from the second heating element;

(e) a power supply for selectively delivering power to either the first or the second heating element;

(f) a thermostat for maintaining the temperature of the refractory slab at a preselected value when the power supply delivers power to the second heating element; and (g) a switch circuit for automatically causing the power supply to switch all of the power from the second heating element to the first heating element for a preselected time period, and for causing the power supply to switch all of the power back to the second heating element after the preselected time period has elapsed, wherein the food heating zone receives heat energy from both the first heating element and the refractory slab during the preselected time period.

2. An oven according to claim 1 wherein the second heating element is disposed below the refractory slab.

3. An oven according to claim 2 further comprising a heat reflector disposed below the second heating element to reflect heat from the second heating element toward the refractory slab.

4. An oven according to claim 1 wherein the first and second heating elements are approximately 1500 watt electrical resistance elements.

5. An oven according to claim 4 wherein the power supply is powered by a standard 110 V outlet.

6. An oven according to claim 1 further comprising:

(h) an indicator which is activated for a fixed period of time upon expiration of the preselected period of time.

7. An oven according to claim 6 wherein the indicator is a buzzer.

8. An oven according to claim 1 wherein the refractory slab is formed of a refractory brick material.

9. An oven according to claim 8 wherein the refractory brick material is cordierite.

10. An oven according to claim 1 further comprising:

(h) an indicator connected to the thermostat for indicating when the refractory slab reaches the preselected value.

11. An oven according to claim 1 wherein the thermostat operates to maintain the temperature of the refractory slab at the preselected value by alternately connecting and disconnecting power to the second heating element.

12. An oven according to claim 1 further comprising:

(h) a fan for convectively distributing heat from the first heating element throughout the food heating zone.

13. An oven according to claim 1 wherein the refractory slab has a surface for receiving a food item to be heated.

* * * * *